(12) United States Patent
Kwon et al.

(10) Patent No.: US 11,614,251 B2
(45) Date of Patent: Mar. 28, 2023

(54) INDOOR AIR QUALITY CONTROL METHOD AND CONTROL APPARATUS USING INTELLIGENT AIR CLEANER

(71) Applicant: LG ELECTRONICS INC., Seoul (KR)

(72) Inventors: Youngtag Kwon, Seoul (KR); Sangyun Kim, Seoul (KR); Daesung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/499,141

(22) PCT Filed: Jul. 12, 2019

(86) PCT No.: PCT/KR2019/008680
§ 371 (c)(1),
(2) Date: Sep. 27, 2019

(87) PCT Pub. No.: WO2021/010506
PCT Pub. Date: Jan. 21, 2021

(65) Prior Publication Data
US 2021/0356160 A1    Nov. 18, 2021

(51) Int. Cl.
*F24F 11/64* (2018.01)
*F24F 11/72* (2018.01)
(Continued)

(52) U.S. Cl.
CPC ............... *F24F 11/64* (2018.01); *F24F 8/10* (2021.01); *F24F 11/56* (2018.01); *F24F 11/72* (2018.01);
(Continued)

(58) Field of Classification Search
CPC .. F24F 11/64; F24F 11/72; F24F 11/56; F24F 8/10; F24F 2110/64; F24F 11/30; G05B 19/042; G05B 2219/2614
See application file for complete search history.

(56) References Cited

U.S. PATENT DOCUMENTS

2005/0279059 A1\* 12/2005 Lee .................. B01D 46/46
  55/356
2016/0041074 A1\* 2/2016 Pliskin ................ F24F 11/30
  435/3

(Continued)

FOREIGN PATENT DOCUMENTS

JP         6252673 B2    12/2017
KR    10-2007-0095712 A    10/2007
(Continued)

*Primary Examiner* — Alicia M. Choi
(74) *Attorney, Agent, or Firm* — Birch, Stewart, Kolasch & Birch, LLP

(57) ABSTRACT

An indoor air quality control method using an intelligent air cleaner is disclosed. An indoor air quality control method using an intelligent air cleaner according to an embodiment of the present invention classifies dust concentration data received from the air cleaner according to predetermined criteria and performs dust concentration pattern analysis. Particularly, dust concentration patterns for respective time periods are analyzed to control the air cleaning intensity of the air cleaner in advance of a predicted time, thereby facilitating efficient indoor air quality management. The intelligent air cleaner and the indoor air quality control method using the same of the present invention can be associated with artificial intelligence modules, devices related with the 5G service, and the like.

7 Claims, 15 Drawing Sheets

(51) Int. Cl.
*F24F 11/56* (2018.01)
*F24F 8/10* (2021.01)
*G05B 19/042* (2006.01)
*F24F 110/64* (2018.01)

(52) U.S. Cl.
CPC ........ *G05B 19/042* (2013.01); *F24F 2110/64* (2018.01); *G05B 2219/2614* (2013.01)

(56) References Cited

U.S. PATENT DOCUMENTS

| | | | |
|---|---|---|---|
| 2016/0369194 A1* | 12/2016 | Duan | F26B 17/10 |
| 2017/0028333 A1* | 2/2017 | Takei | F24F 11/30 |
| 2018/0296050 A1* | 10/2018 | Karakaya | G01N 15/06 |
| 2019/0056138 A1* | 2/2019 | Lee | F24F 11/65 |
| 2019/0232210 A1* | 8/2019 | Hur | F24F 8/90 |
| 2020/0248916 A1* | 8/2020 | Tae | F24F 11/62 |
| 2020/0258029 A1* | 8/2020 | Jung | G06Q 10/06314 |
| 2021/0308610 A1* | 10/2021 | Cheng | B01D 39/163 |
| 2021/0356160 A1* | 11/2021 | Kwon | G05B 19/042 |

FOREIGN PATENT DOCUMENTS

| | | | | |
|---|---|---|---|---|
| KR | 10-2017-0096730 A | | 8/2017 | |
| KR | 10-2018-0134515 A | | 12/2018 | |
| KR | 10-2019-0036574 A | | 4/2019 | |
| KR | 2019103661 A | * | 9/2019 | ............. F24F 11/52 |

\* cited by examiner

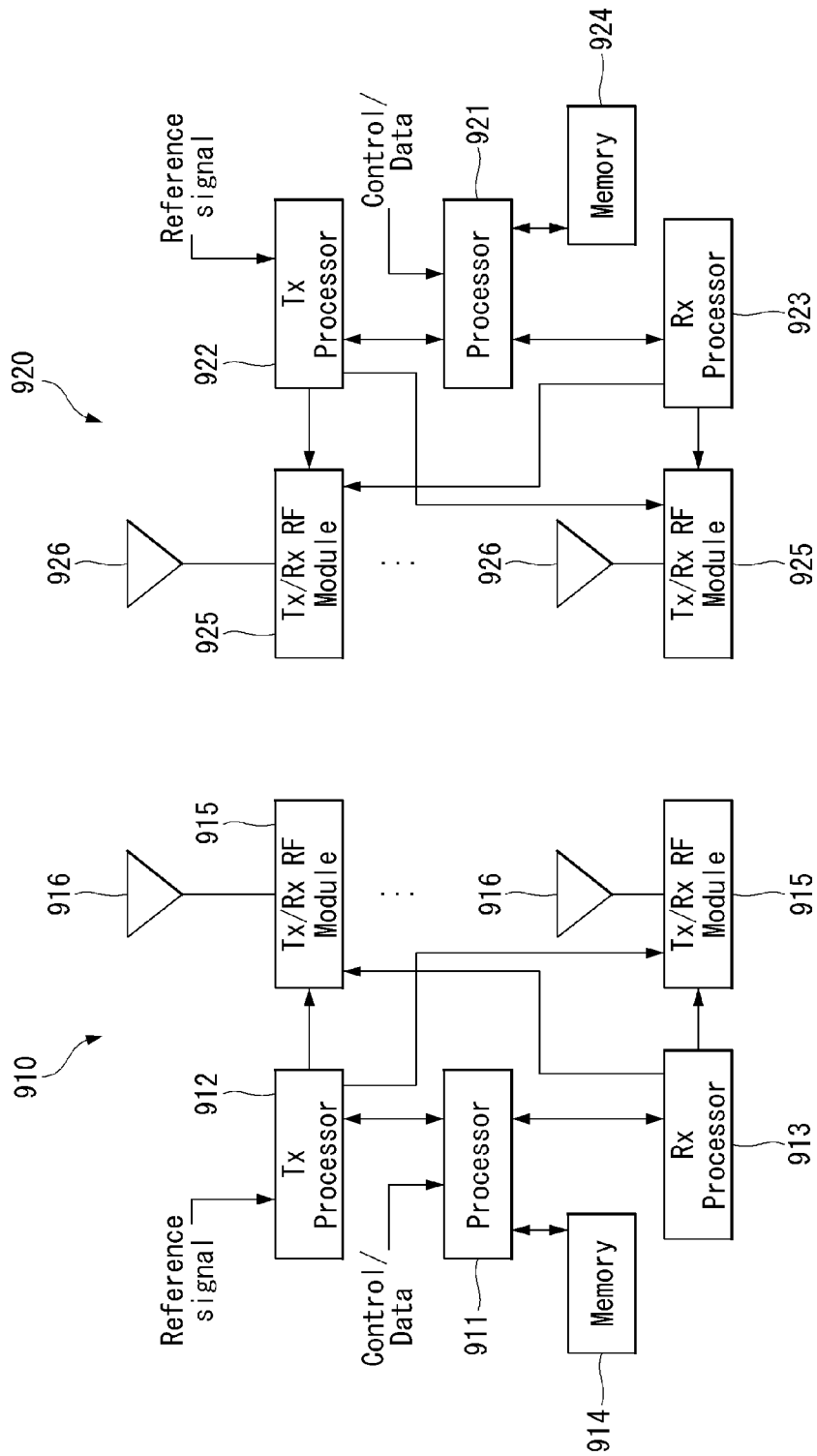
[Figure 1]

[Figure 2]
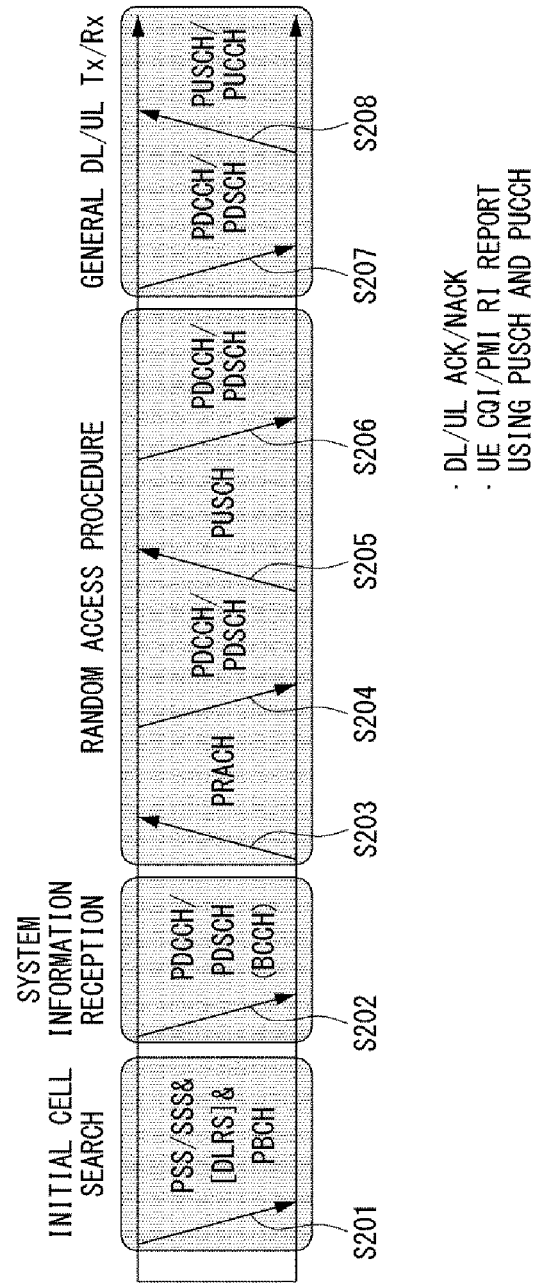

[Figure 3]
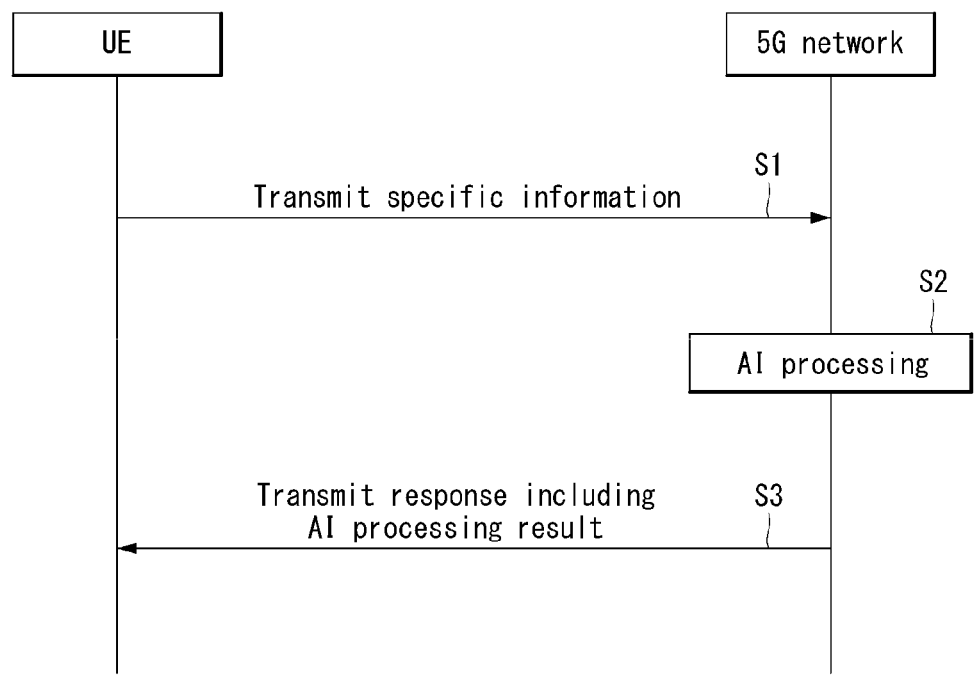

[Figure 4]
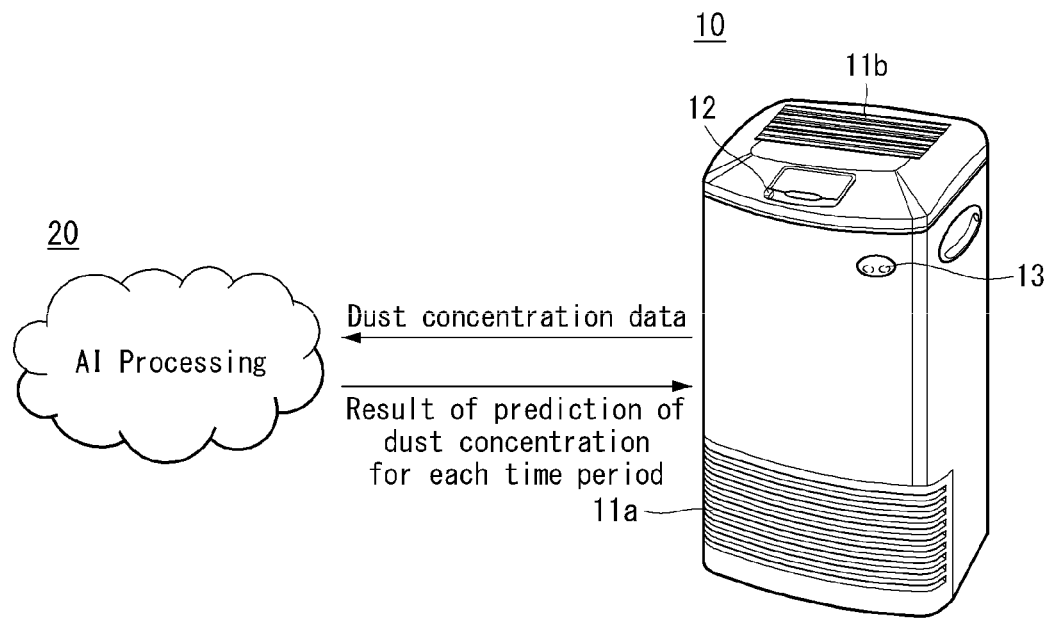

[Figure 5]
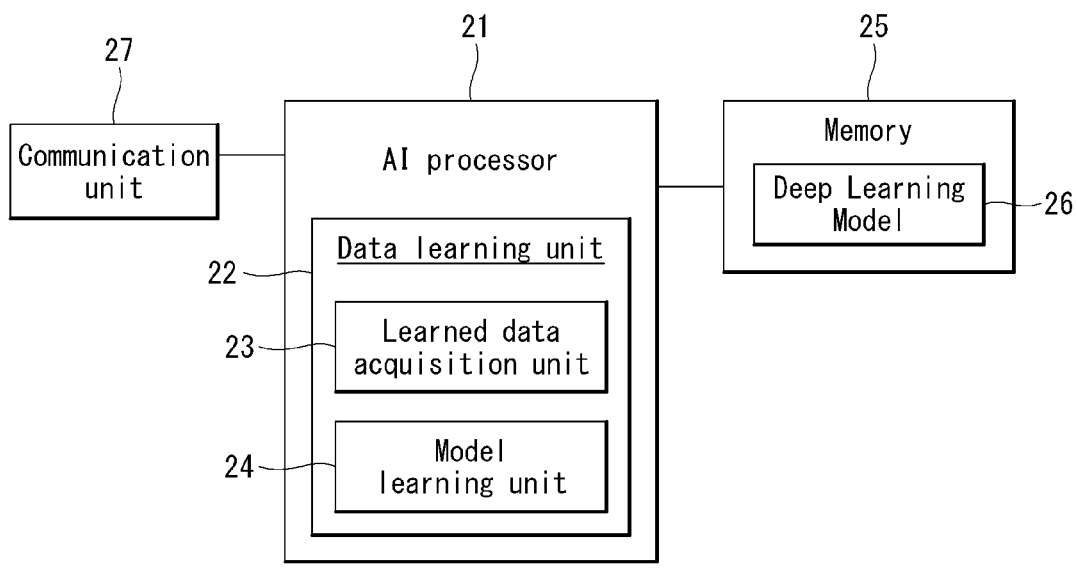

[Figure 6]
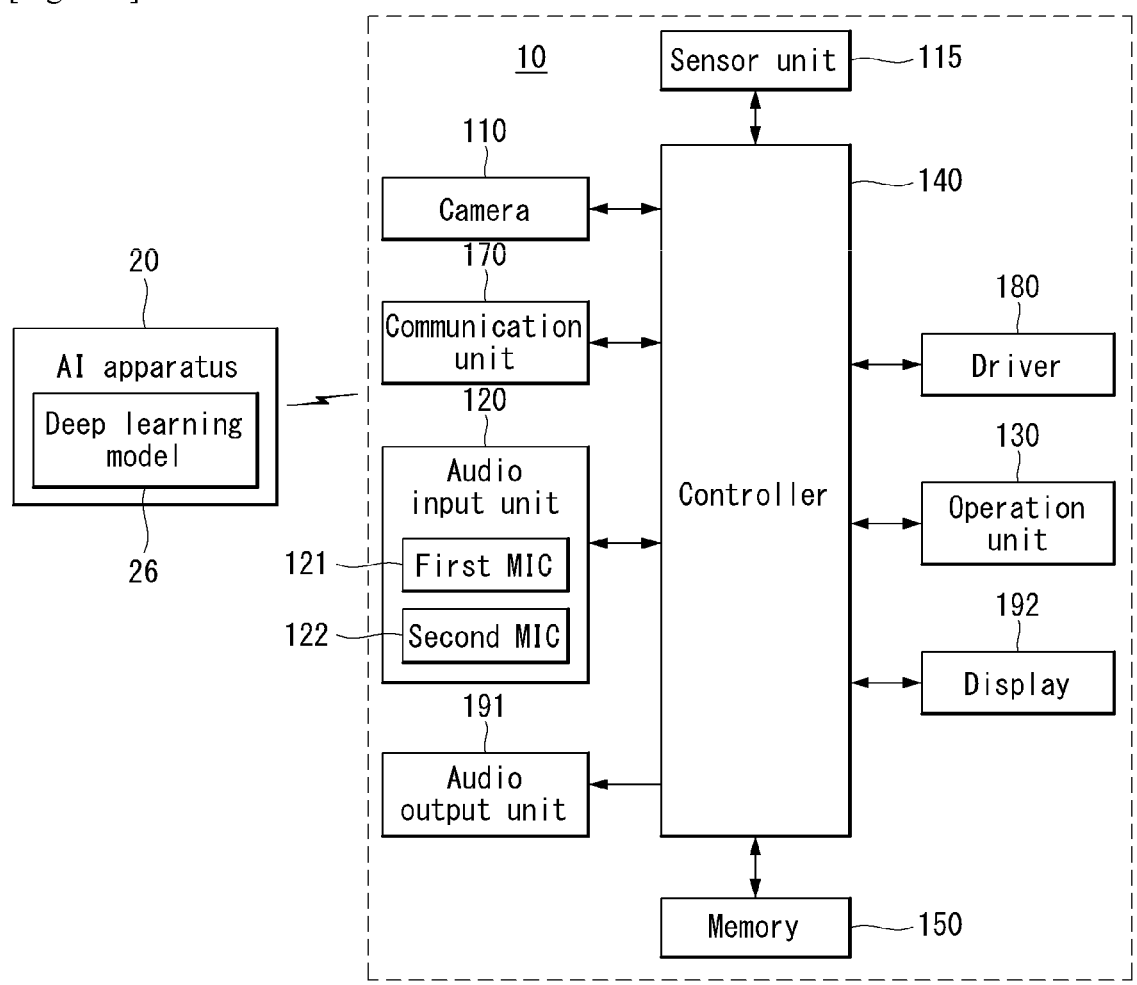

[Figure 7]
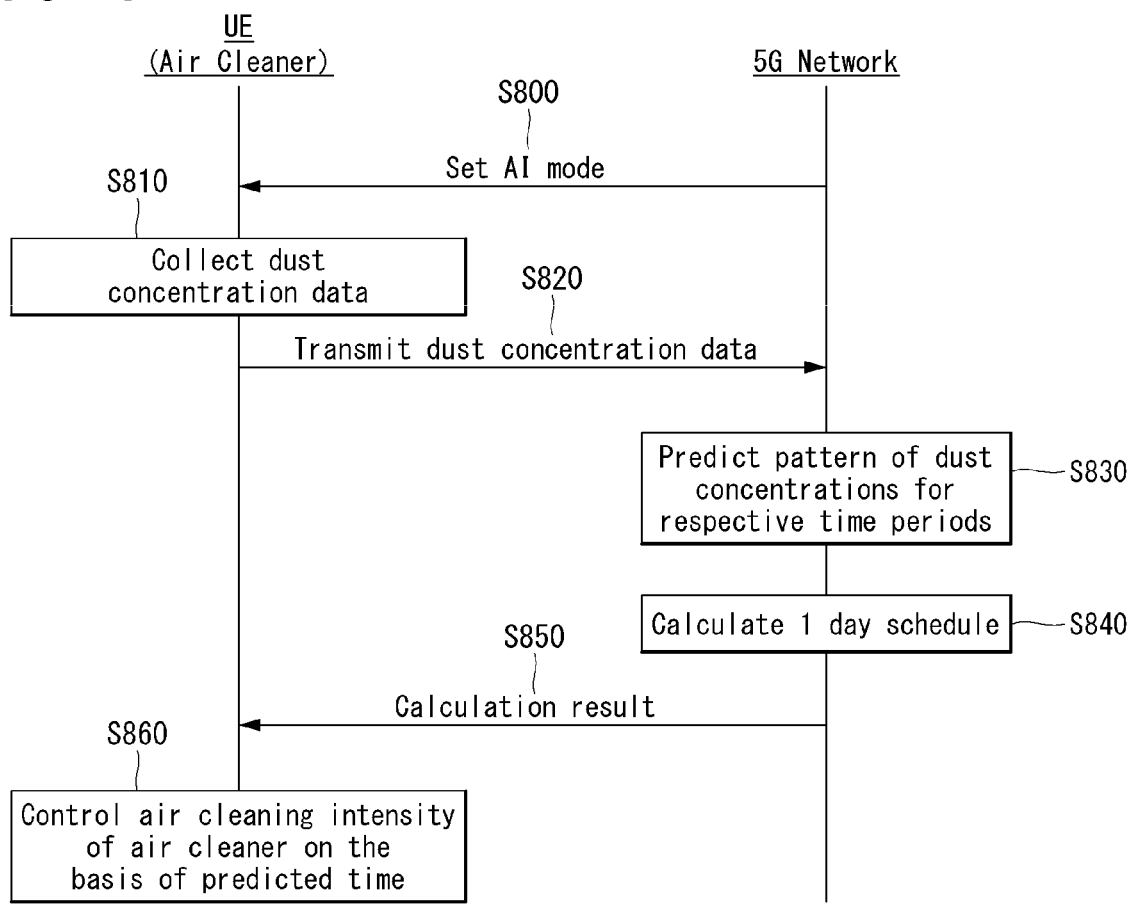

[Figure 8]
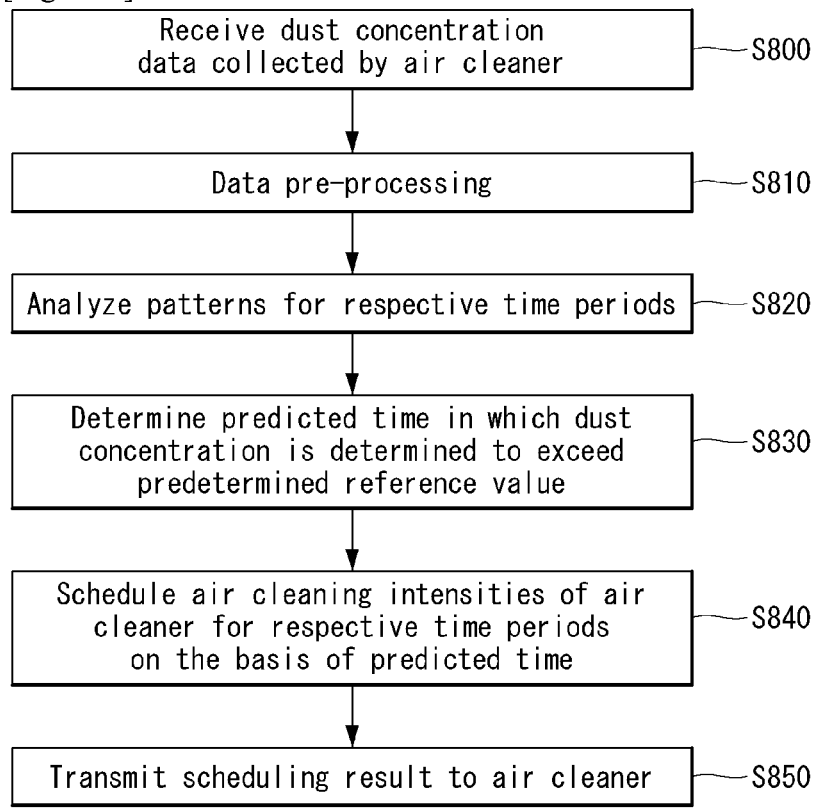

[Figure 9]
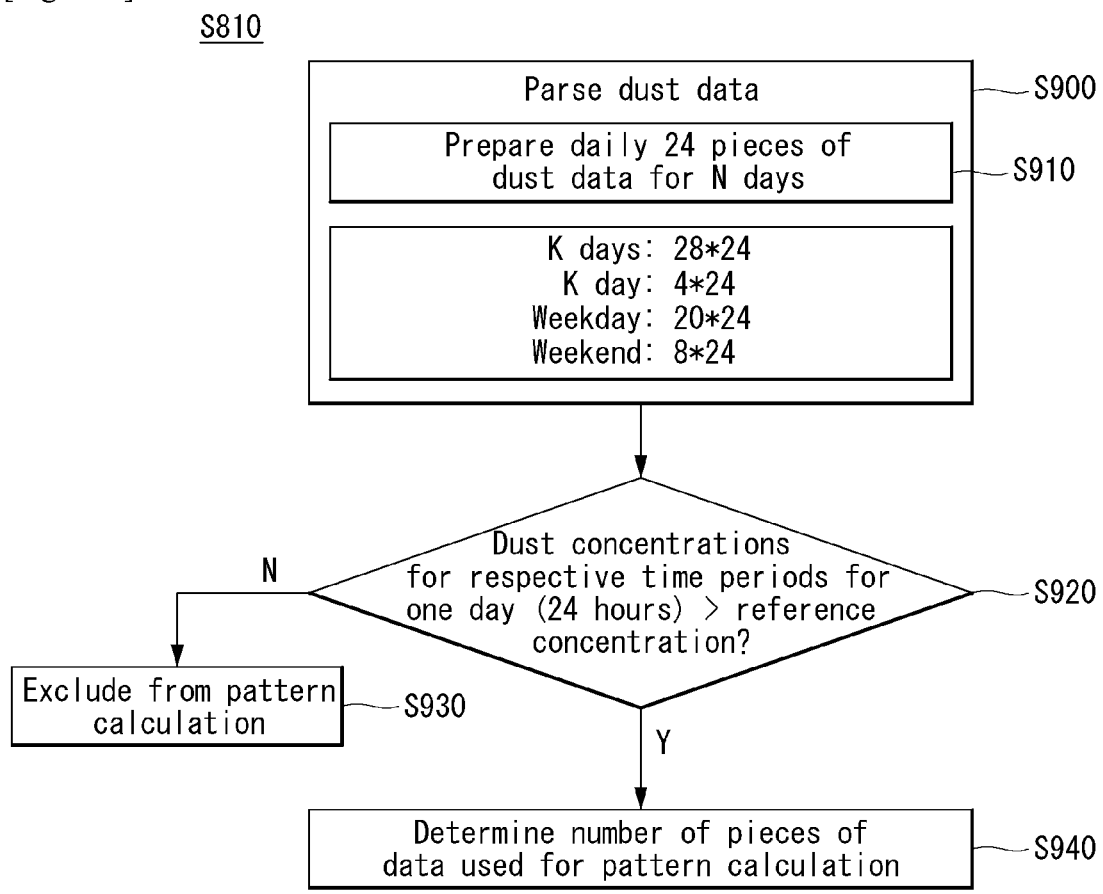

[Figure 10]

| | (1) |
|---|---|
| Type | int[28][24], int |
| Contents | 1) int[28][24]<br>  – PM 2.5 data of 24 hours per day for 28 days<br>  – Store one average value of PM 2.5 data per hour<br>  – PM 2.5 data for latest 28 days based on predicted date<br>2) int<br>  – Information on the first day of 28 days |
| Transmission interval | Once in 24 hours |

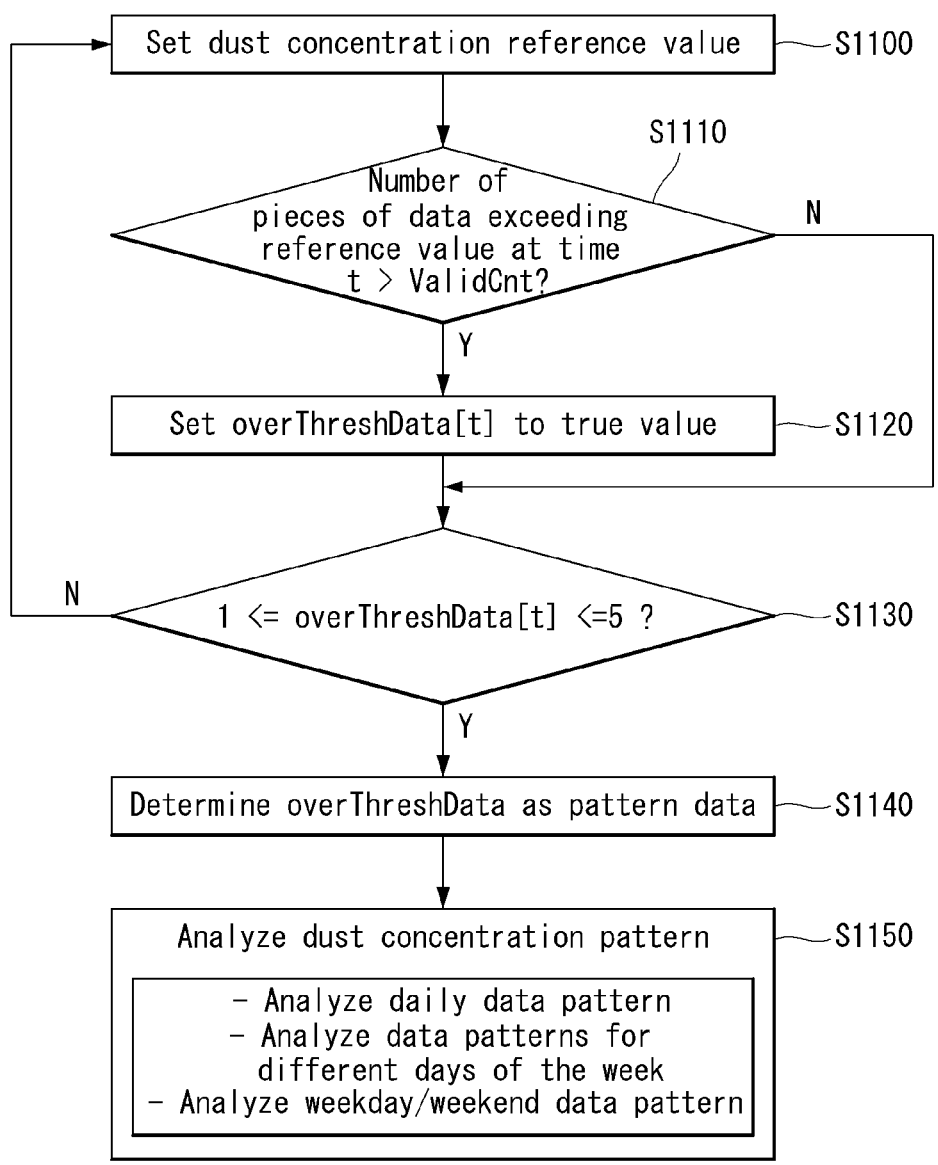

[Figure 12]

|  | (2) |
|---|---|
| Type | byte[24] |
| Contents | - Check intervals in which dust concentration is predicted to be high in 24 hours<br>- 1: bad, 0: not bad |
| Transmission interval | Once in 24 hours |

[Figure 13]
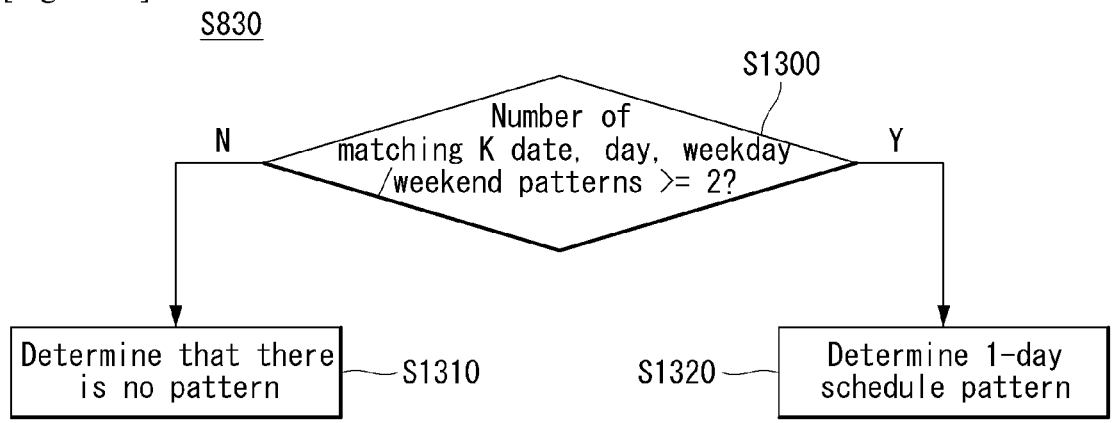

[Figure 14]
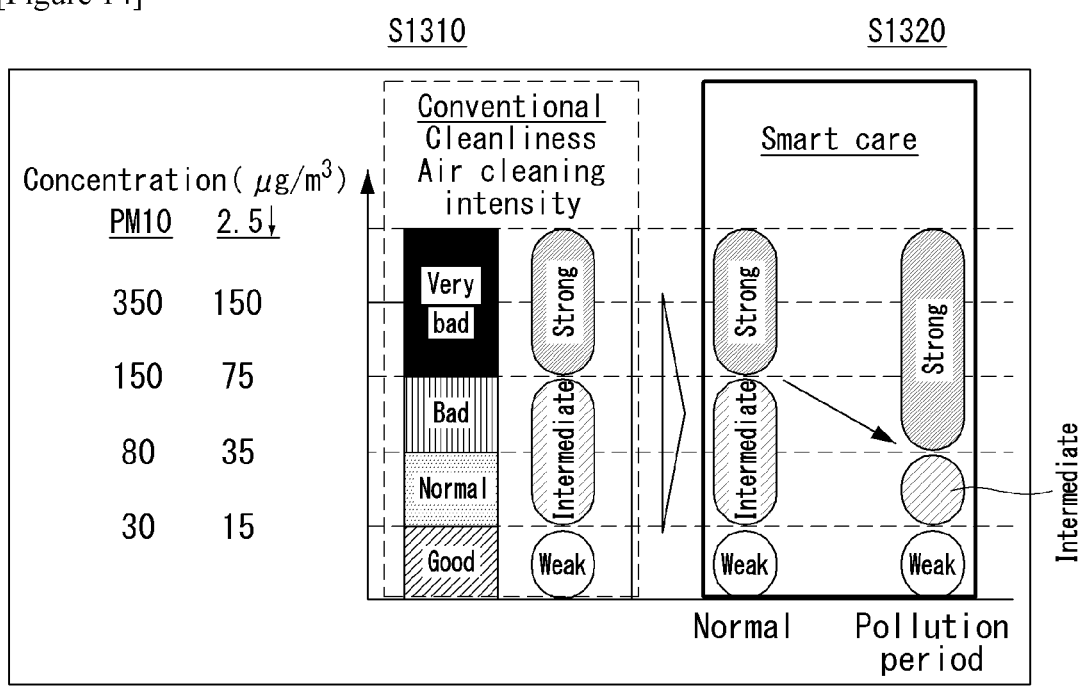

[Figure 15]
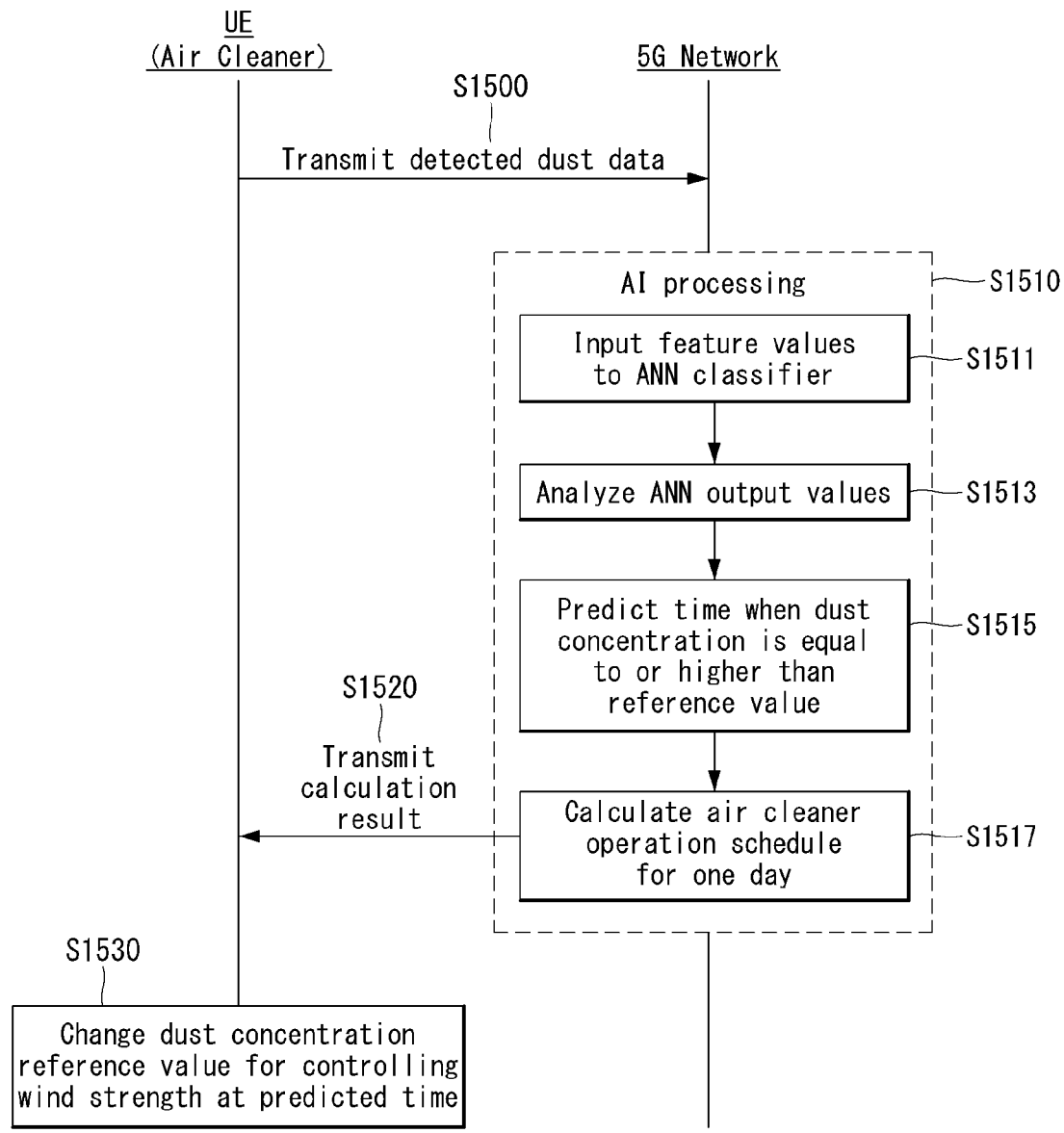

INDOOR AIR QUALITY CONTROL METHOD AND CONTROL APPARATUS USING INTELLIGENT AIR CLEANER

CROSS REFERENCE TO RELATED APPLICATIONS

This application is the National Phase of PCT International Application No. PCT/KR2019/008680, filed on Jul. 12, 2019, which is hereby expressly incorporated by reference into the present application.

TECHNICAL FIELD

The present invention relates to an indoor air quality control method and control apparatus using an intelligent air cleaner, and more specifically, to an indoor air quality control method and control apparatus using an intelligent air cleaner which can control the air cleaning intensity of the intelligent air cleaner in consideration of a time when an indoor air pollution level is predicted to be high.

BACKGROUND ART

An air cleaner has a function of eliminating fine dusts or harmful substances in the air and purifying the air. Such an air cleaner is required to minimize energy consumption and effectively control pollutants in the air.

Meanwhile, when an air cleaner is set to an automatic mode or a normal mode, the strength of the wind of the air cleaner is controlled to be weak when a dust concentration is low and to be strong when the dust concentration is high, in general. That is, a reference value for dust concentrations which is criteria for determining the strength of the wind of the air cleaner is a fixed value and cannot be changed.

Furthermore, when an air cleaner is located in a house, dust concentrations in the house may have various patterns according to living patterns of family members. Accordingly, it is necessary to differently set the strength of the wind of an air cleaner used in a house depending on dust concentration patterns in the house.

DISCLOSURE

Technical Problem

An object of the present invention is to solve the aforementioned necessity and/or problems.

Further, the present invention provides an indoor air quality control method and control apparatus using an intelligent air cleaner which can control the air cleaner more efficiently by flexibly changing a reference value for controlling an air cleaner wind strength at a corresponding time through analysis and prediction of a dust concentration pattern in a house of a user.

Further, the present invention provides an indoor air quality control method and control apparatus using an intelligent air cleaner which can improve air cleaning efficiency by decreasing an air cleaning intensity reference value when a dust concentration data value increases at a predicted time.

Technical Solution

An indoor air quality control method using an intelligent air cleaner according to one aspect of the present invention includes: receiving dust concentration data of an indoor space in which the air cleaner is located from the air cleaner; pre-processing classifying the received dust concentration data according to predetermined criteria to prepare data available for pattern prediction; analyzing a pattern of dust concentration values for respective time periods of collected dust concentration data on the basis of history information; determining a predicted time in which a dust concentration of the indoor space is predicted to exceed a predetermined reference value on the basis of the result of analysis of the pattern of dust concentration values for respective time periods; scheduling air cleaning intensities of the air cleaner for respective time periods on the basis of the predicted time; and transmitting the scheduling result to the air cleaner, wherein the received dust concentration data includes history information related to time when dust concentration data is collected through the air cleaner.

The pre-processing further includes: defining daily M pieces of dust concentration data for N days; and classifying the defined dust concentration data on the basis of a plurality of features.

The plurality of features may include at least one of a daily dust concentration pattern, dust concentration patterns for different days of the week, and a weekday/weekend dust concentration pattern.

The indoor air quality control method using an intelligent air cleaner may further include: determining whether dust concentrations for respective time periods exceed a predetermined reference concentration for one day; and setting data exceeding the reference concentration as dust concentration pattern analysis target data.

In the indoor air quality control method using an intelligent air cleaner, the scheduling result may include information about air cleaning intensities of the air cleaner on the basis of dust concentration patterns predicted for respective time periods for one day.

The indoor air quality control method using an intelligent air cleaner may further include controlling a dust concentration reference value for determining an air cleaning intensity of the air cleaner to be changed in response to the dust concentration state at the predicted time.

The predetermined reference value may be adaptively changed and set on the basis of occupant profile characteristics.

An indoor air quality control apparatus using an intelligent air cleaner according to another aspect of the present invention includes: an RF communication unit; a storage unit for receiving dust concentration data of an indoor space in which the air cleaner is located from the air cleaner and storing the dust concentration data through the RF communication unit; and a processor configured to analyze a pattern of dust concentrations for respective time periods of dust concentration data corresponding to a collection of the received dust concentration data, to determine a predicted time in which a dust concentration of the indoor space is predicted to exceed a predetermined reference value on the basis of the pattern of dust concentrations for respective time periods and to transmit the predicted time to the air cleaner, wherein the received dust concentration data includes history information related to time when dust concentration data is collected through the air cleaner.

The processor may perform pre-processing of classifying the received dust concentration data according to predetermined criteria to prepare data available for pattern prediction and analyze a pattern of dust concentrations for respective time periods of the collected dust concentration data on the basis of history information.

The processor may schedule air cleaning intensities of the air cleaner for respective time periods on the basis of the predicted time.

The processor may define daily M pieces of dust concentration data for N days and classify the defined dust concentration data on the basis of a plurality of features.

The plurality of features may include at least one of a daily dust concentration pattern, dust concentration patterns for different days of the week, and a weekday/weekend dust concentration pattern.

The processor may determine whether dust concentrations for respective time periods exceed a predetermined reference concentration for one day and set data exceeding the reference concentration as dust concentration pattern analysis target data.

An indoor air quality control system using an intelligent air cleaner according to another aspect of the present invention includes: an intelligent air cleaner for acquiring indoor dust concentration data; and a cloud server for receiving dust concentration data of an indoor space in which the air cleaner is located from the air cleaner, wherein dust concentration data received by the cloud server from the air cleaner includes history information related to time when dust concentration data is collected through the air cleaner, and wherein the cloud server is configured: to perform pre-processing of classifying the received dust concentration data according to predetermined criteria to prepare data available for pattern prediction; to analyze a pattern of dust concentrations for respective time periods of the collected dust concentration data on the basis of the history information; and to determine a predicted time in which a dust concentration of the indoor space is predicted to exceed a predetermined reference value on the basis of the result of analysis of the pattern of dust concentration values for respective time periods, to schedule air cleaning intensities of the air cleaner for respective time periods on the basis of the predicted time and to transmit the scheduling result to the air cleaner.

Advantageous Effects

Effects of the indoor air quality control method using an intelligent air cleaner according to an embodiment of the present invention will be described as follows.

According to the present invention, it is possible to control an air cleaner more efficiently by flexibly changing a reference value for controlling an air cleaner wind strength at a corresponding time through analysis and prediction of a dust concentration pattern in a house of a user.

Further, according to the present invention, it is possible to improve air cleaning efficiency by decreasing an air cleaning intensity reference value when a dust concentration data value increases at a predicted time.

It will be appreciated by persons skilled in the art that the effects that could be achieved with the present invention are not limited to what has been particularly described hereinabove and the above and other effects that the present invention could achieve will be more clearly understood from the following detailed description.

DESCRIPTION OF DRAWINGS

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 schematically illustrates a system in which an indoor air quality control method using an intelligent air cleaner according to an embodiment of the present invention is implemented.

FIG. 5 is a block diagram of an AI apparatus applicable to embodiments of the present invention.

FIG. 6 is an exemplary block diagram of an indoor air quality control apparatus using an intelligent air cleaner according to an embodiment of the present invention.

FIG. 7 illustrates a data flow for implementing the indoor air quality control method using an intelligent air cleaner according to an embodiment of the present invention.

FIG. 8 is a flowchart of the indoor air quality control method using an intelligent air cleaner according to an embodiment of the present invention.

FIG. 9 is a diagram for describing data pre-processing in FIG. 8 in more detail.

FIG. 10 is a diagram for describing an exemplary data structure in data pre-processing in FIG. 9.

FIG. 11 is a diagram for describing a process of selecting data to be used in a process of analyzing data for each time period according to an embodiment of the present invention.

FIG. 12 illustrates a data structure related to a result obtained when a cloud server calculates a daily operation schedule of an intelligent air cleaner according to an embodiment of the present invention.

FIG. 13 is a flowchart of a method of calculating a daily operation schedule of an intelligent air cleaner from collected data according to an embodiment of the present invention.

FIG. 14 illustrates an example of controlling the air cleaning intensity of an intelligent air cleaner according to an embodiment of the present invention.

FIG. 15 illustrates an example of controlling the air cleaning intensity of an intelligent air cleaner through AI processing according to an embodiment of the present invention.

The accompanying drawings, which are included to provide a further understanding of the invention and are incorporated in and constitute a part of this specification, illustrate embodiments of the invention and together with the description serve to explain the principles of the invention.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 schematically illustrates a system in which an indoor air quality control method using an intelligent air cleaner according to an embodiment of the present invention is implemented.

Referring to FIG. 4, a system in which the indoor air quality control method using an intelligent air cleaner according to an embodiment of the present invention is implemented may include an intelligent air cleaner 10 and a cloud server 20.

The intelligent air cleaner 10 can transmit dust concentration data sensed in the intelligent air cleaner 10 to the cloud server 20 by performing data communication with the cloud server 20.

The cloud server 20 can perform AI processing on the basis of various types of indoor dust concentration data collected from the intelligent air cleaner 10. The cloud server 20 includes an AI system, an AI module and an AI apparatus for performing AI processing and each of the AI system, the AI module and the AI apparatus may include at least one learning model. The cloud server 20 can transmit AI processing results with respect to dust concentration data received from the intelligent air cleaner 10 to the intelligent air cleaner 10 or transmit a control signal of the intelligent air cleaner 10 according to AI processing results.

Here, the cloud server 20 predicts a dust concentration pattern for each time period which is collected from the intelligent air cleaner 10 and transmits predicted results to the intelligent air cleaner 10. The intelligent air cleaner 10 can control the air cleaning intensity thereof on the basis of the predicted results.

According to an embodiment of the present invention, the cloud server 20 can predict a dust concentration pattern for each time period and cause the air cleaner 10 to adjust the air cleaning intensity thereof to a predetermined intensity before arrival of a time interval predicted as an interval in which an indoor dust concentration will be high in a state in which the air cleaner 10 is aware of the predicted time interval, to thereby manage air quality more efficiently in the predicted time interval.

FIG. 5 is a block diagram of an AI apparatus applicable to embodiments of the present invention.

Referring to FIG. 5, an AI apparatus 20 may include an electronic device or a server including an AI module capable of performing AI processing. Further, the AI apparatus 20 may be included in an air cleaner as at least a component thereof to perform at least a part of AI processing.

AI processing may include all operations related to a controller 140 of the air cleaner. For example, the air cleaner can process/determine air cleanliness or humidity information and generate control signals through AI processing.

An AI device 20 may include an electronic device including an AI module that can perform AI processing, a server including the AI module, or the like. The AI device 20 is a computing device capable of learning a neural network, and can be implemented by various electronic devices such as a server, a desktop PC, a notebook PC, a tablet PC, and the like.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is an exemplary block diagram of an indoor air quality control apparatus using an intelligent air cleaner according to an embodiment of the present invention.

Referring to FIG. 6, the intelligent air cleaner 10 can transmit data that requires AI processing to the AI apparatus 20 through a communication unit, and the AI apparatus 20 including a deep learning model 26 can transmit AI processing results using the deep learning model 26 to the intelligent air cleaner 10. The AI apparatus 20 can refer to the description of FIG. 5.

Referring to FIG. 6, the intelligent air cleaner 10 according to an embodiment of the present invention may include a sensor unit 115 including one or more sensors for sensing various types of data, the controller 140 for controlling the overall operation, and a driver 180 for controlling operations of an indoor fan, a heat exchanger, a valve, a wind direction controller, etc. included in the main body under the control of the controller 140.

In addition, the intelligent air cleaner 10 according to an embodiment of the present invention may include a purification unit (not shown) equipped with one or more filters, and the sensor unit 115 may include an air quality sensor for measuring indoor air quality during driving.

In this case, the controller 140 can calculate a filter contamination level on the basis of data measured by the air quality sensor during operation and an operating time, add the calculated filter contamination level to a pre-stored filter contamination level and control filter replacement notification information to be output when the summed filter contamination level satisfies filter replacement criteria. It is more desirable that the purification unit include a filter unit having a plurality of stacked filters. In this case, it is desirable to set the filter replacement criteria for each filter.

Further, the intelligent air cleaner 10 according to an embodiment of the present invention may further include at least one of an audio input unit 120 for receiving voice commands of a user, a memory 150 for storing various types of data, a communication unit 170 for wireless communication with other electronic devices, a display 192 for displaying predetermined information as an image, and an audio output unit 191 for outputting predetermined information as audio.

The audio input unit 120 can receive external audio signals and voice commands of a user. To this end, the audio input unit 120 may include one or more microphones MIC. Further, the audio input unit 120 may include a plurality of microphones 121 and 122 in order to receive voice commands of a user more correctly. The plurality of microphones 121 and 122 may be separately disposed at different positions, acquire external audio signals and process the acquired external audio signal into electronic signals.

The microphones 121 and 122 may be attached to the inner side of a center panel assembly 10B to come into contact with or neighbor a microphone hole.

Although an example in which the audio input unit 120 includes the first and second microphones 121 and 122 is illustrated in FIG. 5, the present invention is not limited thereto.

The audio input unit 120 may include a processor for converting analog sound into digital data or may be connected to the processor to convert a voice command input by a user into data such that the controller 140 or a predetermined server can recognize the voice command.

Meanwhile, the audio input unit 120 may use various noise removal algorithms in order to remove noise generated in a process of receiving a voice command of a user.

Further, the audio input unit 120 may include components for audio signal processing, such as a filter for removing noise from audio signals received through the microphones 121 and 122 and an amplifier for amplifying and outputting signals output from the filter.

The memory 150 stores various types of information necessary for operation of the intelligent air cleaner 10 and may include a volatile or non-volatile recording medium. A recording medium stores data readable by a microprocessor and may include a hard disk drive (HDD), a solid state disk (SSD), a silicon disk drive (SDD), a ROM, a RAM, a CD-ROM, a magnetic tape, a floppy disk, an optical data storage device, etc.

The memory 150 may store control data used for operation of the air cleaner.

Further, the memory 150 may store operating time of the air cleaner, data detected by the sensor unit 115, and data necessary to calculate and determine an air pollution level, a filter contamination level, etc.

According to an embodiment, a sound source file of a voice command input by a user may be stored in the memory 150 and the stored sound source file may be transmitted to a voice recognition server system through the communication unit 170. Further, the stored sound source file may be deleted after a lapse of predetermined time or after a preset operation is performed.

Meanwhile, the memory 150 can store data for voice recognition and the controller 140 can process a voice signal input by a user received through the audio input unit 120 and perform a voice recognition process.

Alternatively, the intelligent air cleaner 10 may include a voice recognition module (not shown) and the voice recognition module can perform simple voice recognition such as call word recognition according to an embodiment.

Further, a call word determination algorithm for determining whether a voice signal includes a call word may be stored in the memory 150.

The controller 140 and the voice recognition module can determine whether the voice signal includes the call word on the basis of the call word determination algorithm.

Meanwhile, simple voice recognition may be performed by the intelligent air cleaner 10 and advanced voice recognition such as natural language processing may be performed by a voice recognition server system.

For example, when a wake-up voice signal including a preset call word is received, the intelligent air cleaner 10 can switch to a state in which the intelligent air cleaner 10 receives a voice command. In this case, the intelligent air cleaner 10 can perform only a voice recognition process until the call word is input through a voice and the following voice recognition for user voice input can be performed through the voice recognition server system.

Since system resources of the intelligent air cleaner 10 are limited, complicated natural language recognition and processing can be performed through the voice recognition server system.

Alternatively, both the intelligent air cleaner 10 and the voice recognition server system can determine whether a call word is input through a voice. Accordingly, it is possible to reduce misrecognition in determination of call word voice input and increase a recognition rate.

Limited data may be stored in the memory 150. For example, data for recognizing a wake-up voice signal including a preset call word may be stored in the memory 150. In this case, the controller 140 can recognize a wake-up voice signal including a preset call word from a voice input signal of a user received through the audio input unit 120.

Meanwhile, a call word may be set by a manufacturer. For example, "LG Whisen" may be set as a call word. Further, setting of a call word may be changed by a user.

The controller 140 can control a voice command of a user which is input after recognition of a wake-up voice signal such that it is transmitted to the voice recognition server system through the communication unit 170.

The communication unit 170 may include one or more communication modules and perform wireless communication with other electronic devices according to a predetermined communication method to transmit/receive various signals to/from the electronic devices.

Here, the predetermined communication method may be Wi-Fi. In response thereto, a communication module included in the intelligent air cleaner 10 may be a Wi-Fi communication module, but the present invention is not limited thereto.

Alternatively, the intelligent air cleaner 10 may include a communication module of a different type or include a plurality of communication modules. For example, the intelligent air cleaner 10 may include an NFC module, a ZigBee communication module, a Bluetooth communication module, or the like.

The intelligent air cleaner can be connected to a server included in the voice recognition server system, a predetermined external server, a portable terminal of a user, or the like through a Wi-Fi communication module and support smart functions such as remote monitoring and remote control.

The user can check information about the intelligent air cleaner 10 or control the intelligent air cleaner 10 through the portable terminal.

Further, the communication unit 170 can communicate with an access point (AP) apparatus and access a wireless Internet through the AC apparatus to communicate with other devices.

Further, the controller 140 can transmit state information of the intelligent air cleaner 10, a user's voice command and the like to the voice recognition server system through the communication unit 170.

Meanwhile, when a control signal is received through the communication unit 170, the controller 140 can control the intelligent air cleaner 10 such that the intelligent air cleaner 10 operates according to the received control signal.

The display 192 can display, as images, information corresponding to user's command input, processing results corresponding to the user's command input, an operation mode, an operation state, error state, and filter replacement information.

According to an embodiment, the display 192 may be configured as a touch screen by forming a layered structure along with a touch pad. In this case, the display 192 may also be used as an input device through which information can be input according to touch of a user in addition to an output device.

Further, the audio output unit 191 can output, as audio, a notification message such as an alarm sound, an operation mode, an operation state or an error state, information corresponding to user's command input, and processing results corresponding to user's command input. The audio output unit 192 can convert an electronic signal from the controller 140 into an audio signal and output the audio signal. To this end, the audio output unit 191 may include a speaker or the like.

The controller 140 can control the audio output unit 191 and the display 192 such that predetermined information corresponding to each step of a voice recognition process and an intelligent air cleaner control process is provided to the user through visual/auditory means.

The driver 180 controls the quantity of air discharged to an indoor space by controlling rotation of a motor connected to the indoor fan. Further, the driver 180 controls operation of the heat exchanger such that the heat exchanger performs heat exchange of the surrounding air by evaporating or condensing a refrigerant supplied thereto.

The driver 180 is a device that controls the direction of the air discharged to an indoor space in response to a control command of the controller 140 and causes the direction of the air discharged when an outlet is opened to be changed in vertical and horizontal directions. The driver 180 may include a vane driver which drives vanes and a fan driver which drives a fan under the control of the controller 140.

Meanwhile, the driver 180 may include a motor driver and an inverter for driving a motor.

Further, the intelligent air cleaner 10 may further include an operation unit 130 for user input and a camera 110 capable of photographing a predetermined range around the intelligent air cleaner 10.

The operation unit 130 may include a plurality of operation buttons and transfer a signal input through a button to the controller 140.

The camera 110 photographs the surroundings of the intelligent air cleaner 10, external environment, and the like, and a plurality of cameras may be installed for photographing efficiency.

For example, the camera 110 may include an image sensor (e.g., a CMOS image sensor) including at least one optical lens and a plurality of photodiodes (e.g., pixels) by which an image is formed from light that has passed through the optical lens, and a digital signal processor (DSP) which generates an image on the basis of signals output from the photodiodes. The DSP can generate not only a still image but also a moving image composed of frames configured as still images.

According to an embodiment, it is possible to detect presence or absence of an occupant and position information on the basis of an image acquired through the camera 110.

Meanwhile, images captured by the camera 110 may be stored in the memory 150.

The intelligent air cleaner 10 according to an embodiment of the present invention may include the sensor unit 115 equipped with one or more sensors.

For example, the senor unit 115 may include at least one temperature sensor for sensing indoor and outside temperatures, a humidity sensor for sensing humidity, an air quality sensor for sensing air quality such as the quantity of dust, etc. Further, the sensor unit 115 may further include a human body sensor for sensing presence or absence of an occupant and/or a position of the occupant according to an embodiment.

The sensor unit 115 can detect temperature and humidity data of the indoor environment where the intelligent air cleaner 10 is installed. Further, the sensor unit 115 can detect air quality such as the quantity of carbon dioxide and the quantity of fine dust in the indoor environment where the intelligent air cleaner 10 is installed.

The sensor unit 115 can continuously collect data about temperature, humidity and air quality. Alternatively, the sensor unit 115 can collect data about temperature, humidity and air quality at predetermined time intervals.

Further, the controller 140 can control operation of the intelligent air cleaner 10 on the basis of data detected by the sensor unit 115.

The controller 140 can calculate a filter contamination level on the basis of data measured by the air quality sensor of the sensor unit 115 during operation and an operating time, add the calculated filter contamination level to a pre-stored filter contamination level and control filter replacement notification information to be output when the summed filter contamination level satisfies filter replacement criteria. Counting only an operating time to determine whether filter replacement is required does not reflect a contamination degree that varies with usage environment. Accordingly, a filter replacement cycle can be determined more accurately by reflecting a weight according to an air pollution level during operation in an operating time in consideration of both data measured by the air quality sensor and operating time.

Further, the controller 140 can determine the quantity of inflow air on the basis of an air volume during the operating time and the operating time, determine an air pollution level on the basis of data measured by the air quality sensor during operation, and calculate the filter contamination level on the basis of the quantity of inflow air and the air pollution level.

It is possible to predict a filter replacement time on the basis of usage time, air volume and air state information using the air quality sensor that is included in order to provide indoor air quality information to a user without an additional device for checking a filter contamination level.

Meanwhile, when an indoor air pollution level exceeds a predetermined reference value irrespective of an environment in which an air cleaner is used, a conventional system operates the air cleaner regardless of an outside air pollution level, causing the lifespan of a filter to decrease. However, according to an embodiment of the present invention, when indoor air quality is lower than outside air quality, the lifespan of a filter can be managed more efficiently by causing ventilation rather than operating an air cleaner.

Further, the audio output unit 191 can output an audio guidance message for audio guidance of ventilation recommendation information in response to ventilation recommendation of the cloud server 20 under the control of the controller 140. It is possible to efficiently manage the air cleaner based on a real-time outside air pollution level by announcing ventilation recommendation information through the audio guidance message.

Meanwhile, the display 192 can display the ventilation recommendation information.

According to an embodiment, it is possible to determine presence or absence of a user in a predetermined space, position information of the user, and the like on the basis of data acquired by the camera 110 or the sensor unit 115. Further, the controller 140 can determine whether a user approaches through the camera 110 or the sensor unit 115. In this case, the controller 140 can control the audio output unit 191 and/or the display 192 to output the ventilation recommendation information when approach of the user is detected.

According to an embodiment, the controller 140 can control the ventilation recommendation information to be transmitted to other electronic devices through the communication unit 170. For example, the intelligent air cleaner 10 can transmit the ventilation recommendation information to a predetermined server, a portable terminal of a user, or the like such that the intelligent air cleaner 10 is prevented from being excessively operated and the air cleaner is efficiently managed through ventilation.

FIG. 7 illustrates a data flow for implementing the indoor air quality control method using an intelligent air cleaner according to an embodiment of the present invention.

Although the operation shown in FIG. 7 represents a data flow between an air cleaner and a 5G network, the 5G network in FIG. 7 may refer to the cloud server which can control the air cleaner. Further, the cloud server can include an AI apparatus, an AI module and an AI system capable of predicting a dust concentration pattern for each time period. For convenience of description, the 5G network is called a cloud server.

First, the cloud server can transmit a control signal for allowing the air cleaner to operate in an AI mode to the air cleaner (S800).

Here, operating the air cleaner in the AI mode may mean that the wind strength of the air cleaner can be controlled differently according to situations. When the air cleaner is set to a normal mode or an automatic mode, the wind strength of the air cleaner is controlled by a fixed value all the time.

Referring to FIG. 7, the indoor air quality control method using an intelligent air cleaner according to an embodiment of the present invention can be implemented through data communication with the intelligent air cleaner 10, a 5G network and the Meteorological Administration server. Here, the 5G network may include the cloud server 20 in the present invention. For convenience of description, the 5G network is called the cloud server 20. Further, the air cleaner 10 may refer to the intelligent air cleaner 10 in this specification.

The air cleaner 10 can collect dust concentration data (S810) and transmit collected indoor dust concentration data to the cloud server 20 (S820).

The cloud server 20 can perform an operation of predicting a dust concentration pattern for each time period from the dust concentration data received from the air cleaner 10 (S830). The cloud server 20 can predict the dust concentration pattern through a predetermined algorithm. The cloud server 20 can apply an algorithm API which returns a result value of prediction of a dust concentration high state or low state for one day (24 hours) through pattern analysis of input values.

The cloud server 20 can calculate a daily schedule (S840). The daily schedule may be a schedule of controlling the air cleaning intensity of the air cleaner in response to an indoor air quality state through prediction of an indoor air quality pattern for each time period for one day. For example, when an indoor air quality pattern is predicted to be in a bad state in a period of 8:00 to 10:00 in the period of 24 hours, an air cleaning intensity can be set to "strong" from among "strong" "intermediate" and "weak" in the period of 8:00 to 10:00. In general, the air cleaning intensity can be set to "weak" when an indoor air quality state is good on the basis of PM 2.5. When the indoor air quality state is normal or bad, the air cleaning intensity can be set to "intermediate". In addition, when the indoor air quality state is very bad, the air cleaning intensity can be set to "strong". According to an embodiment of the present invention, when the indoor air quality state is predicted to be "bad" in the period of 8:00 to 10:00, the air cleaning intensity can be set to "strong" in order to prevent the indoor air quality state is changed to a very bad state with the lapse of time.

The cloud server 20 can transmit the daily schedule calculation result to the air cleaner 10.

The air cleaner 10 can control the air cleaning intensity of the air cleaner on the basis of a time predicted based on the received calculation result (S860).

FIG. 8 is a flowchart of the indoor air quality control method using an intelligent air cleaner according to an embodiment of the present invention.

The control method illustrated in FIG. 8 can be performed in the cloud server 20, and more specifically, implemented in the processor or AI apparatus, AI module and AI system of the cloud server 20. For convenience, description will be made on the assumption that the control method illustrated in FIG. 8 is implemented in the processor.

Referring to FIG. 8, the processor can receive dust concentration data collected by the air cleaner (S800).

The processor can perform a data pre-processing operation for extracting a dust concentration pattern for each time period on the basis of the received dust concentration data (S810).

The dust concentration pattern for each time period may refer to a daily dust concentration pattern, dust concentration patterns for different days of the week, or a dust concentration pattern for a weekday/weekend.

To analyze the dust concentration pattern for each time period, the data can be classified into daily data, data for different days of the week, weekday data and weekend data through the data pre-processing operation.

The processor can analyze the dust concentration pattern for each time period on the basis of data pre-processing results (S820).

The processor can analyze dust concentration data classified according to the classification criteria for each time period.

The processor can determine a predicted time in which a dust concentration is predicted to exceed a predetermined reference value (S830).

The processor can schedule the air cleaning intensity of the air cleaner on the basis of the predicted time (S840).

The processor can transmit scheduling results to the air cleaner 10 (S850).

The scheduling results may be information about the air cleaning intensity of the air cleaner on the basis of a dust concentration pattern predicted for each time period for one day.

FIG. 9 is a diagram for describing the data pre-processing in FIG. 8 in more detail.

Referring to FIG. 9, the processor parses dust concentration data received from the air cleaner (S900). Criteria for parsing the data include an operation of defining 24 pieces of data per day for N days (S910) and classifying the defined dust concentration data on the basis of a plurality of features.

For example, the processor can define data obtained by collecting 24 pieces of data per day for 28 days. Further, the processor can define 4*24 pieces of data in order to define data of K day. Further, the processor can define 20*24 pieces of data in order to define weekday data. Further the processor can define 8*24 pieces of data in order to define weekend data.

The processor can determine whether a dust concentration for each time period exceeds a reference concentration for one day (24 hours) (S920). Here, the reference concentration can be defined as, for example, 20, 30, 40, 50, 60, 75, 100, 150, or the like. For example, when the reference concentration is 20, the processor can define data with respect to dust concentrations for respective time periods which exceed 20 for one day as data for which pattern calculation is possible. Accordingly, the processor can determine the number of pieces of data used for pattern calculation (S940).

If there is data with respect to dust concentrations for respective time periods which are less than the reference concentration for 24 hours, the processor can exclude the data from pattern calculation (S930).

FIG. 10 is a diagram for describing an exemplary data structure in the data pre-processing in FIG. 9.

Referring to FIG. 10, for dust concentration data for 4 weeks (28 days), PM 2.5 data can be defined for 24 hours per day for 28 days. Further, one average value of PM 2.5 data may be calculated per hour. Further, PM 2.5 data for latest 28 days on the basis of a predicted date may be defined. Moreover, information on the first day of the 28 days may be defined. Accordingly, the processor may define daily data, data for different days of the week, weekday data and weekend data from the data for different days of the week together.

FIG. 11 is a diagram for describing a process of selecting data to be used in a process of analyzing data for each period time according to an embodiment of the present invention.

Referring to FIG. 11, the processor can set a dust concentration reference value (S1100). Although the dust concentration reference value can be set to one of 20, 30, 40, 50, 60, 75, 100 and 150, for example, the present invention is not limited thereto and the dust concentration reference value may be changed in consideration of characteristics, a living pattern and the like of an occupant residing in the indoor space.

The processor can determine whether the number of pieces of data which exceeds the predetermined reference value is equal to or greater than a valid count at a time t (S1110). Here, the valid count is a value considering reliability of pattern analysis and may be a minimum count required for pattern analysis. The valid count ValidCnt is adaptively variable for respective time periods. For example, the valid count can be set to be relatively high in a time interval corresponding to a high dust concentration. Further, when a dust concentration increases or decreases for a certain time, for example, the valid count can be set to be relatively low.

When the number of pieces of data which exceeds the predetermined reference value is equal to or greater than the valid count at the time t, the processor can set the data to a true value (S1120). Data which is not classified as a true value is not used for pattern analysis.

In an embodiment of the present invention, when the valid count of data which exceeds the predetermined reference value at the time t is equal to or greater than 1 or less than 5, the processor can determine the data as data to be used for dust concentration pattern analysis (S1140). Definition of 1 and 5 for the valid count is merely an example and can be changed in various manners according to a dust concentration pattern for each time period.

The processor can analyze dust concentration data patterns on the basis of the aforementioned features (daily data, data for different days of the week, and weekday/weekend data) upon determination of data to be used for dust concentration pattern analysis (S1150).

FIG. 12 illustrates a data structure related to a result obtained when the cloud server calculates a daily operation schedule of the intelligent air cleaner according to an embodiment of the present invention.

Referring to FIG. 12, air cleaner operation schedules can be displayed separately for a time interval in which a dust concentration is predicted to be high and a time interval in which the dust concentration is predicted to be low for one day. The cloud server may calculate air cleaner operation schedules and transmit the same to the air cleaner once a day, but the present invention is not limited thereto. Further, the air cleaner schedules may include a time interval in which the dust concentration is predicted to be normal according to air quality state.

FIG. 13 is a flowchart of a method of calculating a daily operation schedule of the intelligent air cleaner from collected data according to an embodiment of the present invention.

The processor can determine whether the number of pieces of data matching a weekday/weekend data pattern is 2 or more as a result of analysis of the weekday/weekend data pattern (S1300).

For example, as a result of analysis of a dust concentration data pattern on Monday, a pattern in which indoor dust concentrations are low in a time interval of 24 hours other than the period of 18:00 to 20:00 and are very high in the period of 18:00 to 20:00 can be provided. In this case, when it is assumed that one piece of dust concentration data is sensed per hour, a one-day schedule pattern in which dust concentrations are very high in a weekday evening time period (18:00 to 20:00) can be determined (S1320).

Meanwhile, as a result of analysis of a daily data pattern, data patterns for different days of the week, and a weekday/weekend data pattern, when it is determined that the number of pieces of data matching the data patterns is 2 or less (S1300: No), it is possible to determine that a patterning and management rule cannot be detected from daily data, data for different days of the week and weekday/weekend data and to conclude that there is no pattern (S1320).

FIG. 14 illustrates an example of controlling the air cleaning intensity of the intelligent air cleaner according to an embodiment of the present invention.

Referring to FIG. 14, according to an embodiment of the present invention, the air cleaning intensity is set to "weak" when dust concentration data has a "good state", set to "intermediate" when the dust concentration data has a "normal state" and set to "strong" when the dust concentration data has a "very bad state" in the normal mode of the air cleaner. When the air cleaner is set to the AI mode according to an embodiment of the present invention, if a "good-normal-bad-very bad" pattern for one day is extracted according to the aforementioned indoor dust concentration pattern result, the air cleaning intensity can be set to "week wind-intermediate wind-strong wind-strong wind" according to an embodiment of the present invention.

According to an embodiment of the present invention, the cloud server may realize a received dust concentration pattern through AI processing.

FIG. 15 illustrates an example of controlling the air cleaning intensity of the intelligent air cleaner through AI processing according to an embodiment of the present invention.

Referring to FIG. 15, the air cleaner 10 can transmit detected dust concentration data to the cloud server (S1500). The AI processor of the cloud server can classify collected dust concentration data into the aforementioned plurality of features and define the classified data as input values for an ANN classified (S1511).

The processor can predict a time for which dust concentrations are equal to or higher than a reference value (S1515) by analyzing ANN output values (S1513). The processor can calculate an air cleaner operation schedule for one day on the basis of the predicted time information (S1517).

The processor can transmit the calculation result to the air cleaner 10 (S1520) and the air cleaner 10 can change the dust concentration reference value for controlling wind strength at the predicted time (S1530).

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

Furthermore, although the invention has been described with reference to the exemplary embodiments, those skilled in the art will appreciate that various modifications and variations can be made in the present invention without departing from the spirit or scope of the invention described in the appended claims. For example, each component described in detail in embodiments can be modified. In addition, differences related to such modifications and applications should be interpreted as being included in the scope of the present invention defined by the appended claims.

Although description has been made focusing on examples in which the present invention is applied to automated vehicle & highway systems based on 5G (5 generation) system, the present invention is also applicable to various wireless communication systems and autonomous devices.

The invention claimed is:

1. An indoor air quality control method using an intelligent air cleaner, the air cleaner including:
   a sensor configured to gather dust concentration data of an indoor space in which the air cleaner is located;
   a communication module configured to communicate information to a cloud server;
   a fan;
   a driver configured to control operations of the fan; and
   a controller configured to control operation of the sensor, the communication module, the fan and the driver,
   the indoor air quality control method comprising:
      receiving, by the cloud server, the dust concentration data from the communication module of the air cleaner;
      pre-processing, by the cloud server, for classifying the received dust concentration data according to predetermined criteria to prepare data available for pattern prediction;
      analyzing, by the cloud server, a pattern of dust concentration values for respective time periods of collected dust concentration data on the basis of history information;
      determining, by the cloud server, a predicted time in which a dust concentration of the indoor space is predicted to exceed a predetermined reference value on the basis of the result of analysis of the pattern of the dust concentration values for the respective time periods;
      scheduling, by the cloud server, air cleaning intensities of the air cleaner for the respective time periods on the basis of the predicted time and outputting a scheduling result indicative thereof; and
      transmitting, by the cloud server, the scheduling result to the communication module of the air cleaner,
   wherein the received dust concentration data includes the history information related to time when dust concentration data is collected through the air cleaner,
   wherein the pre-processing further comprises:
      defining daily M pieces of dust concentration data for N days; and
      classifying the defined dust concentration data on the basis of a plurality of features including at least one of a daily dust concentration pattern, dust concentration patterns for different days of the week, and a weekday/weekend dust concentration pattern,
   wherein the method further comprises:
      determining whether dust concentrations for the respective time periods exceed a predetermined reference concentration for one day, and then excluding the dust concentration data that is less than the predetermined reference concentration from the analysis of the pattern of the dust concentration values, to determine a number of pieces of data used for the analysis of the pattern of the dust concentration values; and setting data exceeding the predetermined reference concentration as dust concentration pattern analysis target data and selecting classified received dust concentration data for learning from the pre-processing step, and wherein the scheduling result includes changing a speed of the fan by the driver.

2. The indoor air quality control method of claim 1, wherein the scheduling result includes information about the air cleaning intensities of the air cleaner on the basis of the concentration patterns predicted for the respective time periods for one day.

3. The indoor air quality control method of claim 2, further comprising changing a dust concentration reference value for determining an air cleaning intensity of the air cleaner to be changed to in response to a dust concentration state at the predicted time.

4. The indoor air quality control method of claim 1, wherein the predetermined reference value is adaptively changed and set on the basis of occupant profile characteristics.

5. An indoor air quality control apparatus using an intelligent air cleaner, the air cleaner including:
  a sensor configured to gather dust concentration data of an indoor space in which the air cleaner is located;
  a communication module;
  a fan;
  a driver configured to control operations of the fan; and
  a controller configured to control operation of the sensor, the communication module, the fan and the driver,
  the indoor air quality control apparatus comprising:
    a radio frequency (RF) communication module;
    a memory configured to receive the dust concentration data from the communication module of the air cleaner and store the dust concentration data through the RF communication module; and
    a processor configured to analyze a pattern of dust concentration values for respective time periods of the dust concentration data corresponding to a collection of the received dust concentration data, to determine a predicted time in which a dust concentration of the indoor space is predicted to exceed a predetermined reference value on the basis of the pattern of the dust concentration values for the respective time periods, schedule air cleaning intensities of the air cleaner for the respective time periods on the basis of the predicted time and to transmit a scheduling result to the communication module of the air cleaner,
  wherein the received dust concentration data includes history information related to time when dust concentration data is collected through the air cleaner,
  wherein the processor performs pre-processing of classifying the received dust concentration data according to predetermined criteria to prepare data available for pattern prediction and analyzes the pattern of the dust concentration values for the respective time periods of the collected dust concentration data on the basis of the history information,
  wherein the processor defines daily M pieces of dust concentration data for N days and classifies the defined dust concentration data on the basis of a plurality of features including at least one of a daily dust concentration pattern, dust concentration patterns for different days of the week, and a weekday/weekend dust concentration pattern,
  wherein the processor is further configured to:
    determine whether dust concentrations for the respective time periods exceed a predetermined reference concentration for one day, and then exclude the dust concentration data that is less than the predetermined reference concentration from the analysis of the pattern of the dust concentration values, to determine a number of pieces of data used for the analysis of the pattern of the dust concentration values, and
    set data exceeding the predetermined reference concentration as dust concentration pattern analysis target data and select dust concentration data for learning from the classified received dust concentration data from the pre-processing step, and
  wherein the predicted time includes changing a speed of the fan by the driver.

6. The indoor air quality control apparatus of claim 5, wherein the processor schedules air cleaning intensities of the air cleaner for the respective time periods on the basis of the predicted time.

7. An indoor air quality control system using an intelligent air cleaner, comprising:
  an intelligent air cleaner for acquiring indoor dust concentration data, the intelligent air clear including:
    a sensor configured to gather dust concentration data of an indoor space in which the air cleaner is located;
    a communication module configured to communicate information to a cloud server;
    a fan;
    a driver for controlling operations of the fan; and
    a controller configured to control operation of the sensor, the communication module, the fan and the driver,
  the indoor air quality control system; and
  the cloud server configured to receive the dust concentration data from the air cleaner,
  wherein dust concentration data received by the cloud server from the air cleaner includes history information related to time when dust concentration data is collected through the air cleaner, and
  wherein the cloud server is configured to:
    perform pre-processing of classifying the received dust concentration data according to predetermined criteria to prepare data available for pattern prediction;
    analyze a pattern of dust concentration values for respective time periods of the collected dust concentration data on the basis of the history information; and
    determine a predicted time in which a dust concentration of the indoor space is predicted to exceed a predetermined reference value on the basis of the result of analysis of the pattern of the concentration values for the respective time periods, schedule air cleaning intensities of the air cleaner for the respective time periods on the basis of the predicted time and to output a scheduling result indicative thereof, and transmit the scheduling result to the air cleaner,
  wherein the pre-processing further comprises:
    defining daily M pieces of dust concentration data for N days; and
    classifying the defined dust concentration data on the basis of a plurality of features including at least one of a daily dust concentration pattern, dust concentration patterns for different days of the week, and a weekday/weekend dust concentration pattern, wherein the cloud server is further configured to:
determine whether dust concentrations for the respective time periods exceed a predetermined reference concentration for one day, and then exclude the dust concentration data that is less than the predetermined reference concentration from the analysis of the pattern of dust the dust concentration values, to determine a number of pieces of data used for the analysis of the pattern of the dust concentration values, and set data exceeding the reference concentration as dust concentration pattern analysis target data and select dust concentration data for learning from the classified received dust concentration data from the pre-processing step, and wherein the scheduling result includes changing a speed of the fan by the driver.

* * * * *